United States Patent [19]

Lowry

[11] 3,955,757

[45] May 11, 1976

[54] ULTRACENTRIFUGE FOR SEPARATING FLUID MIXTURES

[75] Inventor: Ralph A. Lowry, Charlottesville, Va.

[73] Assignee: The United States of America as represented by the United States Energy Research and Development Administration, Washington, D.C.

[22] Filed: Sept. 28, 1960

[21] Appl. No.: 59,127

[52] U.S. Cl. .............................. 233/19 R; 233/27; 233/DIG. 1
[51] Int. Cl.² ........................................ B04B 11/00
[58] Field of Search ................ 233/36, 37, 30, 33, 233/42, 43, 44, 47, 47 A, 46, 19, 28, 18, 1,7, 10, 11, 12, 13, 27

[56] References Cited
UNITED STATES PATENTS

| | | | |
|---|---|---|---|
| 1,061,656 | 5/1913 | Black | 233/28 |
| 2,551,815 | 5/1951 | Schulz | 233/11 |
| 2,563,550 | 8/1951 | Quist | 233/33 |
| 2,584,345 | 2/1952 | Hall | 233/28 |
| 2,876,949 | 3/1959 | Skarstrom | 233/1 |
| 2,917,229 | 12/1959 | Benedetto | 233/11 |
| 2,947,471 | 8/1960 | Beams | 233/13 |
| 2,947,472 | 8/1960 | Skarstrom | 233/28 |

*Primary Examiner*—Stephen J. Lechert, Jr.
*Attorney, Agent, or Firm*—Dean E. Carlson; David S. Zachry; Randall G. Erdley

EXEMPLARY CLAIM

1. A centrifuge for the separation of fluid mixtures having light and heavy fractions comprising a cylindrical rotor, disc type end-plugs closing the ends of the rotor, means for mounting said rotor for rotation about its cylindrical axis, a housing member enclosing the rotor, a vacuum chamber in said housing about the central portion of the rotor, a collection chamber at each end of the housing, the innermost side of which is substantially formed by the outer face of the end-plug, means for preventing flow of the fluid from the collection chambers to said vacuum chamber, at least one of said end-plugs having a plurality of holes therethrough communicating between the collection chamber adjacent thereto and the inside of the rotor to induce countercurrent flow of the fluid in the centrifuge, means for feeding fluid to be processed into the centrifuge, means communicating with the collection chambers to extract the light and heavy separated fractions of the fluid, and means for rotating the rotor.

8 Claims, 3 Drawing Figures

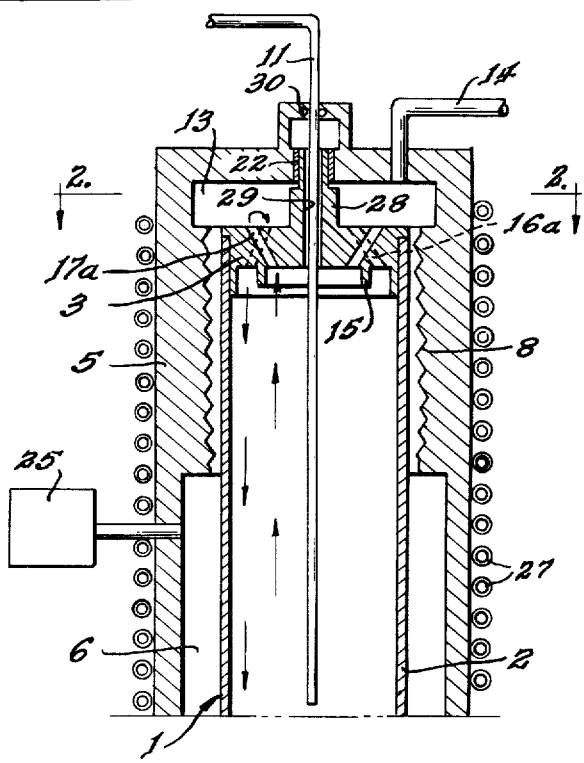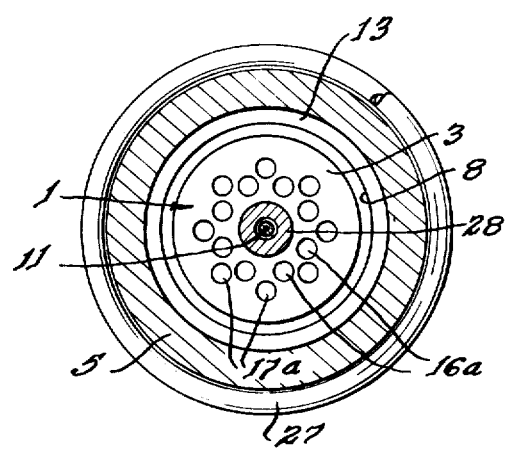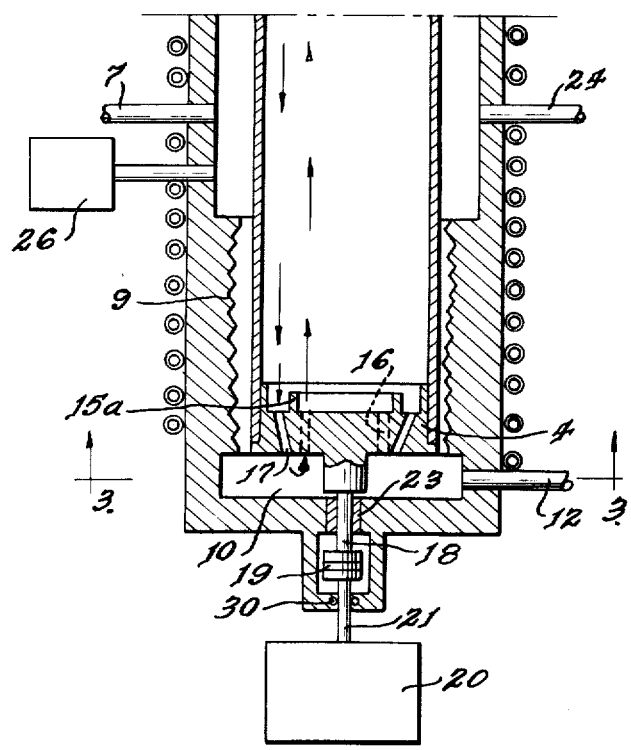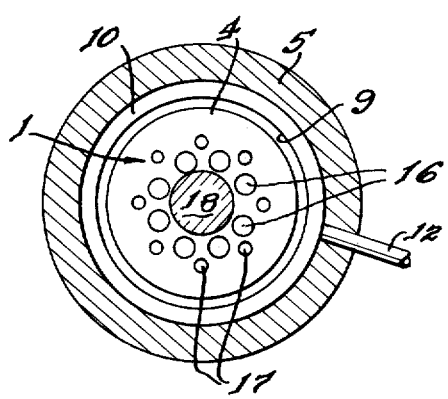

ULTRACENTRIFUGE FOR SEPARATING FLUID MIXTURES

This invention relates to centrifugal separators and more particularly to a novel method and apparatus for separating a fluid mixture into its separate components and is particularly adapted to the separation of gaseous constituents of different molecular weights, for example, the separation of isotopes of a single element in gaseous mixtures.

There are three general types of centrifuge operation prevalent for the separation of isotopes. They are the evaporative method, concurrent or flow-through operation, and countercurrent operation. The centrifuge of this invention utilizes countercurrent flow, in which case the gas flows in one direction near the rotational axis and in the opposite direction near the inner peripheral wall of the centrifuge rotor. The countercurrent flow method permits a large separation factor per unit and has been shown to be generally superior for isotope separation.

The high centrifugal field in the centrifuge gives rise to a radial separation of the light and heavy fractions, concentrating the light fractions near the axis and the heavy fractions near the periphery.

In previously known countercurrent gas centrifuges the process gas may be fed into the centrifuge at each end from where is passes through the separating chamber and out through the opposite end, the gas flowing in thin concentric streams in opposite axial directions whereby the inner stream enriched in lighter fractions effects a net transport of the lighter fractions to the exit end of the spinning tube and the peripheral stream, enriched in the heavy fractions, effects a net transport of the heavy fractions to the exit at the other end thereby producing an axial concentration gradient of the light and heavy fractions. By means of this invention the gas is caused to flow radially inwardly and outwardly at opposite ends of the spinning tube to produce a continuous recurrent countercurrent flow pattern within the separating chamber. In the latter case, no external fluid handling is necessary to produce the countercurrent flow pattern, making this technique the most desirable. It is necessary in this case, however, to pump the gas radially at the ends of the spinning tube. The provision of a means to establish the most efficient flow pattern is a basic problem in the design of countercurrent gas centrifuges.

It is an object of this invention to provide a centrifuge having means for establishing and maintaining a countercurrent flow pattern.

It is a further object of the invention to provide a centrifuge having means integral with the rotor ends for producing countercurrent flow by a positive pumping action.

Other objects and inherent advantages of the invention will be apparent from the description which follows, especially when taken in conjunction with the accompanying drawings.

The invention may be more fully understood by reference to the accompanying drawings which illustrate one embodiment of the invention and wherein:

FIG. 1 is a schematic elevational view partially in cross-section of a centrifuge illustrating the invention.

FIG. 2 is a cross-sectional view taken along the line 2—2 of FIG. 1.

FIG. 3 is a cross-sectional view taken along the line 3—3 of FIG. 1.

The invention will be explained and illustrated by way of example in connection with long bowl centrifuges, i.e., those having a large length to diameter ratio. However, the inventor does not intend to be limited thereto since the invention has equal facility in short bowl centrifuges.

Referring now to the drawings, FIG. 1 discloses an embodiment of the centrifuge of the invention comprising a rotor 1 which consists of a cylindrical tube 2 closed at its ends by top end-plug 3 and bottom end-plug 4. The rotor is supported for high speed rotation within a housing member 5, clearance being provided between the outer wall of the rotor and the inner wall of the housing member. A hollow chamber 6 is provided in the central portion of the housing surrounding the rotor to serve as a vacuum chamber. It is ordinarily necessary to operate the rotor of a high-speed centrifuge in a highly evacuated housing to minimize gas drag effects on the rotor. Such a vacuum may be maintained by continuous pumping through pipeline 7 with a conventional vacuum pumping apparatus (not shown). The centrifuge is provided with end chambers 10 and 13 which are formed between the inner faces of the housing ends and the outer faces of the end-plugs. To seal the vacuum chamber from the end chambers 10 and 13 molecular pumps are provided at the ends of the rotor. These molecular pumps are comprised of spiral grooves 8 and 9 on the inside wall of the upper and lower ends of the housing, operating in conjunction with the spinning rotor. For maximum efficiency, a minimum clearance is provided between the rotor and the housing at these locations. These spiral grooves have appropriate right and left hand configurations, depending on the direction of rotation of the rotor, so that at sufficiently high peripheral speeds of the rotor they drive back gas tending to enter into the evacuated space 6 from the end chambers 10 and 13 of the housing. For example, for counter-clockwise rotation of the rotor, when viewed from above, the spiral on the upper end 8 will be a right hand thread and that on the lower end 9 will be a left hand thread. It is to be noted, however, that it is possible to design the apparatus so that the molecular pumps operate to produce the required vacuum without the aid of a supplemental vacuum pump, in which case pipe line 7 would be omitted.

Product lines 12 and 14 are connected through the housing ends to chambers 10 and 13, respectively, to extract the separated fractions.

End-plugs 3 and 4 are provided with holes which induce countercurrent flow at both ends of the centrifuge. The holes are in two groups as best shown in FIGS. 2 and 3. The holes 16 of the innermost group in the end-plug 4 are shown as extending approximately parallel to the rotational axis of the rotor and equally spaced on a circle concentric with said axis. The holes 17 of the outer group are shown in FIG. 1 as extending through the end-plug at a greater radius than the inner group. In the end-plug 3, the holes of both groups 16a and 17a are shown as extending through the plugs at at angle with respect to the rotational axis of the rotor, the holes of the one group being askew to the holes of the other group so that in a diametrical cross-sectional view they appear to cross. The effect of this design is that the holes 17a which open on the inner face of the plug at the smaller radius open through the outer face of the plug at a greater radius than the group of holes 16a, and vice versa.

End-plugs 3 and 4 are also provided with inwardly extending ridges 15 and 15a, respectively. These ridges are cylindrical and coaxial with the rotor and are disposed between the two groups of holes in the end-plugs. They function to reduce mixing of the countercurrent streams near the ends of the rotor.

The rotor may be driven through shaft 18, extending from end-plug 4, by a gas turbine, electric motor, or some other suitable driving means 20, having drive shaft 21, capable of producing the angular speed required to obtain effective separation. The driving means is connected to shaft 18 through a flexible coupling 19. Hollow shaft 28 extends from end-plug 3 to support the other end of the rotor.

The process gas mixture is fed into the rotor through tube 11 which extends through hollow shaft 28 and end-plug 3 to approximately the axial center of the rotor. End-plug 3 is provided with central hole 29 to accommodate feed tube 11 with clearance. Sealing means, such as "O" ring seals are provided at 30 between feed tube 11 and the adjacent end of the housing and between drive shaft 21 and the other end of the housing.

The rotor shafts 18 and 28 are journalled in bearings 22 and 23 in the ends of the housing. These bearings also function as sealing means to prevent the escape of fluid in the end chambers through the housing ends. The bearings may be lubricated, in which case, it will be necessary to collect the oil which leaks therefrom.

The centrifuge of this invention is suitable for operation as a subcritical or supercritical centrifuge. The centrifuge is supercritical if the rotor passes through one or more of the critical rotational speeds due to the natural flexural vibration frequencies of the tube comprising the separating bowl. A subcritical centrifuge is one which operates below the lowest of these critical rotational speeds. In order to operate the device of FIG. 1 at supercritical speeds, it may be necessary to provide high damping bearings (not shown) at one or both ends of the rotor cooperating with end shafts 18 and 28 to accelerate the rotor through the critical speeds. These may be retractable so that they can be disengaged from the end shaft, or shafts, when less damping is required to permit operation with lower friction bearing systems.

The rotor should preferably be made from a material having a high strength to density ratio, such as aluminum, for example. In the device of FIG. 1, the rotor may be made of 1.5 inch × 52 inch × 1/16 inch 7075-T6 aluminum alloy tubing (ASTM Standards, 1958, pg. 1195). The effective separation length for this rotor is about 50 inches (i.e., between the end-plugs).

The end-plugs are made from the same material as the rotor. There are eight holes in each group in the end-plugs and the holes of each group are equally spaced circumferentially on a circle locating their centers. The holes 16 in end-plug 4 may be 0.125 inch in diameter located on a circle ¾ inch in diameter. The holes 17 may be 0.078 inch in diameter located on a one inch diameter circle on the outer face of end-plug 4 and extending therefrom radially outwardly at an angle of 8°5' with the rotor axis. Holes 17a may be 0.125 inch in diameter located on the outer face of end-plug 3 on a circle of ½ inch radius and extending therefrom radially inwardly at an angle of 17° 45' with the rotor axis. The holes 16a may be 0.125 inch in diameter located on the outer face of the end-plug on a circle of 0.375 inch radius and extending radially outwardly therefrom at an angle of 17° 45' with the rotor axis.

The rotor may be operated at approximately 3200 RPS, for example, which corresponds to an inner peripheral speed of 350 meters per second, which is somewhat below the limit imposed by the strength of the material.

The operation will now be described. The rotor is accelerated to operating speed and the process gas is admitted through feedline 11 into the rotor. Inside the rotor the gas spins and the lighter and heavier fractions are separated due to the effect of centrifugal force, the heavier fractions concentrating near the periphery of the rotor and the lighter fractions concentrating nearer the axis. In this embodiment the flow pattern, as shown by the arrows, is axially upwardly toward end-plate 3 along the axis of the rotor, out through holes 17a into end chamber 13, radially inwardly in chamber 13, through holes 16a into the rotor, axially downwardly along the periphery of the rotor toward end-plug 4, out through holes 17 into end chamber 10, radially inwardly in chamber 10, and back into the rotor through holes 16 thence upwardly along the axis to complete the cycle.

The holes in the end-plugs induce countercurrent flow by virtue of the difference in the radial pressure distribution inside and outside the centrifuge. The radial pressure gradient outside the rotor is much lower because the average angular velocity of the gas has been reduced by the drag of the housing ends and bearings. With respect to the outer holes 17 in end-plug 4, due to the centrifugal field the pressure at the inner face of the end-plug in the peripheral region in the vicinity of the holes is greater than that at the outer face, causing the gas to flow out of the rotor. With respect to the inner holes 16, however, the reverse is true and the gas will flow into the rotor. With respect to the end-plug 3, the holes 17a function in the manner of a centrifugal pump to pump the gas out of the rotor into end chamber 13, causing the gas to flow out of the rotor. Holes 16a operate in like manner to pump the gas from end chamber 13 into the rotor. The gas entering the end chambers through the end plugs flows radially inward due to its losing angular momentum within the ends chamber.

Since the flow, as illustrated in FIG. 1, in the peripheral region of the rotor, is toward end chamber 10 and the heavy fractions are concentrated in this region, the gas enriched in the heavy fractions accumulates in chamber 10. Conversely, since the flow near the axial region, where the light fractions are concentrated, is toward chamber 13, gas enriched in the light fractions accumulates in this chamber. Gas enriched in the light fractions is then drawn off through line 14 from chamber 13 and gas enriched in the heavy fractions is drawn off through line 12 from chamber 10.

It may be desirable to control the temperature of the rotor to prevent undesirable thermal influences on the flow of the gas. The temperature of the ends can be controlled to some extent by providing cooling coils 27 on the outside of the molecular pumps. Additional cooling may be accomplished by surrounding the ends of the rotor with a small amount of helium to remove the heat generated by the viscous drag in the molecular pumps and that conducted into the rotor from the bearings. The helium may be introduced through pipe line 24 which is connected outside the centrifuge to a recycling system (not shown). The temperature of the rotor may be monitored by infrared detectors located approximately 12 inches from the ends of the rotor as shown at 25 and 26.

Although the centrifuge of the invention has been illustrated as having countercurrent pumping holes in both end-plugs, the device will operate with these holes in only one end-plug. Since countercurrent pumping is produced by both end-plugs, one end-plug could be omitted.

From the foregoing it will be observed that the present invention provides a centrifuge for separating fluid mixtures, and particularly isotopic gaseous mixtures, that is characterized by an efficient countercurrent flow pattern and separation factor, due to its large length to diameter ratio, of a magnitude heretofore unknown in centrifugal separators. While particular embodiments of the invention have been illustrated and described herein, it is not intended that the invention be limited to such embodiments, but changes and modifications may be made and incorporated herein within the spirit of the invention and the scope of the appended claims.

What is claimed is:

1. A centrifuge for the separation of fluid mixtures having light and heavy fractions comprising a cylindrical rotor, disc type end-plugs closing the ends of the rotor, means for mounting said rotor for rotation about its cylindrical axis, a housing member enclosing the rotor, a vacuum chamber in said housing about the central portion of the rotor, a collection chamber at each end of the housing, the innermost side of which is substantially formed by the outer face of the end-plug, means for preventing flow of the fluid from the collection chambers to said vacuum chamber, at least one of said end-plugs having a plurality of holes therethrough communicating between the collection chamber adjacent thereto and the inside of the rotor to induce countercurrent flow of the fluid in the centrifuge, means for feeding fluid to be processed into the centrifuge, means communicating with the collection chambers to extract the light and heavy separated fractions of the fluid, and means for rotating the rotor.

2. The centrifuge as claimed in claim 1 wherein the means for preventing flow of the fluid from the collection chambers to said vacuum chamber are molecular pumps comprising a helical groove on the inside wall of the housing about each end of the rotor operating in conjunction with the spinning rotor, each helical groove being in such a direction as to cause fluid flow toward its adjacent end of the housing, and means for cooling the centrifuge.

3. The centrifuge as claimed in claim 1 wherein the holes extending through one of the end-plugs are in a direction substantially parallel to the rotor axis, and are comprised of an inner and an outer group, the outer group being at a greater radius than the inner group and being in close proximity to the inner periphery of the rotor.

4. The centrifuge as claimed in claim 1 wherein said holes through one of the end-plugs are in two groups which open through the inner face of the end-plug at different radii, the holes of each group extending through the endplug at an angle to the rotor axis and in a direction askew to that of the other group so that the holes cross in the end-plug without intersecting.

5. The centrifuge as claimed in claim 1 wherein the means for feeding fluid into the centrifuge comprises a tube extending through one end of the housing and end-plug coaxially with the rotor to the approximate center thereof.

6. The centrifuge as claimed in claim 3 wherein two groups of holes are provided in the other end-plug, the holes of each group extending through said other end-plug at an angle to the rotor axis, the direction of the holes in each group being skewed with respect to that of the other group, the holes of one group opening through the inner face of the said other end-plug in close proximity to the inner periphery of the rotor at a greater radius than the other group of holes at the inner face, and opening through the outer face of said other end-plug at a smaller radius than the other group of holes at the outer face.

7. The centrifuge as claimed in claim 3 wherein a short cylindrical ridge is provided on the inner face of said one end-plug and is located between the two groups of holes.

8. A centrifuge for the separation of fluid mixtures having light and heavy fractions comprising a cylindrical rotor, disc-type and end-plugs closing the ends of the rotor, means for mounting said rotor for rotation about its cylindrical axis, a housing member enclosing the rotor, a vacuum chamber in said housing about the central portion of the rotor, a collection chamber at each end of the housing, the innermost side of which is substantially formed by the outer face of the end-plug, means for preventing flow of the fluid from the collection chambers to said vacuum chamber, one of said end-plugs having a plurality of holes extending therethrough in a direction substantially parallel to the rotor axis and arranged in an inner and an outer group, the outer group being at a greater radius than the inner group and being in close proximity to the inner periphery of the rotor, a plurality of holes extending through the other end plug and arranged in two groups, the holes of each group extending through said other end plug at an angle to the rotor axis, the direction of the holes in each group being skewed with respect to that of the other group, the holes of one group opening through the inner face of said other end-plug in close proximity to the inner periphery of the rotor at a greater radius than the other group of holes at said inner face and opening through the outer face of said other end-plug at a smaller radius than the other group of holes at said outer face, a short cylindrical ridge on the inner face of each end-plug extending axially inwardly between said groups of holes, means for feeding fluid to be processed into the centrifuge, means communicating with the collection chambers to extract the light and heavy separated fractions of the fluid, and means for rotating the rotor.

* * * * *